United States Patent
Kawaguchi et al.

(10) Patent No.: US 8,355,318 B2
(45) Date of Patent: Jan. 15, 2013

(54) NODE APPARATUS INTERCONNECTING RING NETWORK

(75) Inventors: Mitsuhiro Kawaguchi, Kawasaki (JP); Shigeo Tani, Kawasaki (JP); Ryoji Azumi, Kawasaki (JP); Hideki Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 235 days.

(21) Appl. No.: 12/608,528

(22) Filed: Oct. 29, 2009

(65) Prior Publication Data

US 2010/0124417 A1    May 20, 2010

(30) Foreign Application Priority Data

Nov. 18, 2008  (JP) .................. 2008-294097

(51) Int. Cl.
*G01R 31/08* (2006.01)
(52) U.S. Cl. ...................................... 370/222
(58) Field of Classification Search .............. 370/222, 370/223, 216, 217, 248, 218, 351, 224, 225, 370/241, 389; 398/1, 2, 3, 4
See application file for complete search history.

(56) References Cited

U.S. PATENT DOCUMENTS

| | | | |
|---|---|---|---|
| 5,265,096 A | | 11/1993 | Parruck |
| 5,781,535 A | * | 7/1998 | Russ et al. .................. 370/248 |
| 6,038,678 A | * | 3/2000 | Fukushima et al. ........... 714/4.1 |
| 6,122,249 A | | 9/2000 | Mochizuki et al. |
| 6,337,848 B1 | | 1/2002 | Takatsu et al. |
| 7,480,326 B2 | * | 1/2009 | Bui et al. .................... 375/219 |
| 2004/0151172 A1 | | 8/2004 | Notani et al. |
| 2006/0018260 A1 | | 1/2006 | Richmond et al. |
| 2006/0274782 A1 | * | 12/2006 | Rikitake .................... 370/465 |

FOREIGN PATENT DOCUMENTS

| | | |
|---|---|---|
| JP | 09-247197 | 9/1997 |
| JP | 11-122269 | 4/1999 |

OTHER PUBLICATIONS

United Kingdom Search Report issued on Feb. 1, 2010 in corresponding United Kingdom Patent Application GB0918542.2.
Notice of Reason for Refusal dated Sep. 25, 2012, for corresponding Japanese Application No. 2008-294097.

* cited by examiner

*Primary Examiner* — Kwang B Yao
*Assistant Examiner* — Anh Ngoc Nguyen
(74) *Attorney, Agent, or Firm* — Staas & Halsey LLP

(57) ABSTRACT

There is provided a node apparatus having a plurality of interface units for interfacing to a transmission line, switch units of a work system and a protection system for switching signals of the transmission line, and a service selector used to relieve a network failure over ring networks interconnected by node apparatuses, the node apparatus including a first controller for controlling the service selector in the switch units, and a second controller for controlling setting information of alarm detection in case of using the service selector in the interface units.

10 Claims, 19 Drawing Sheets

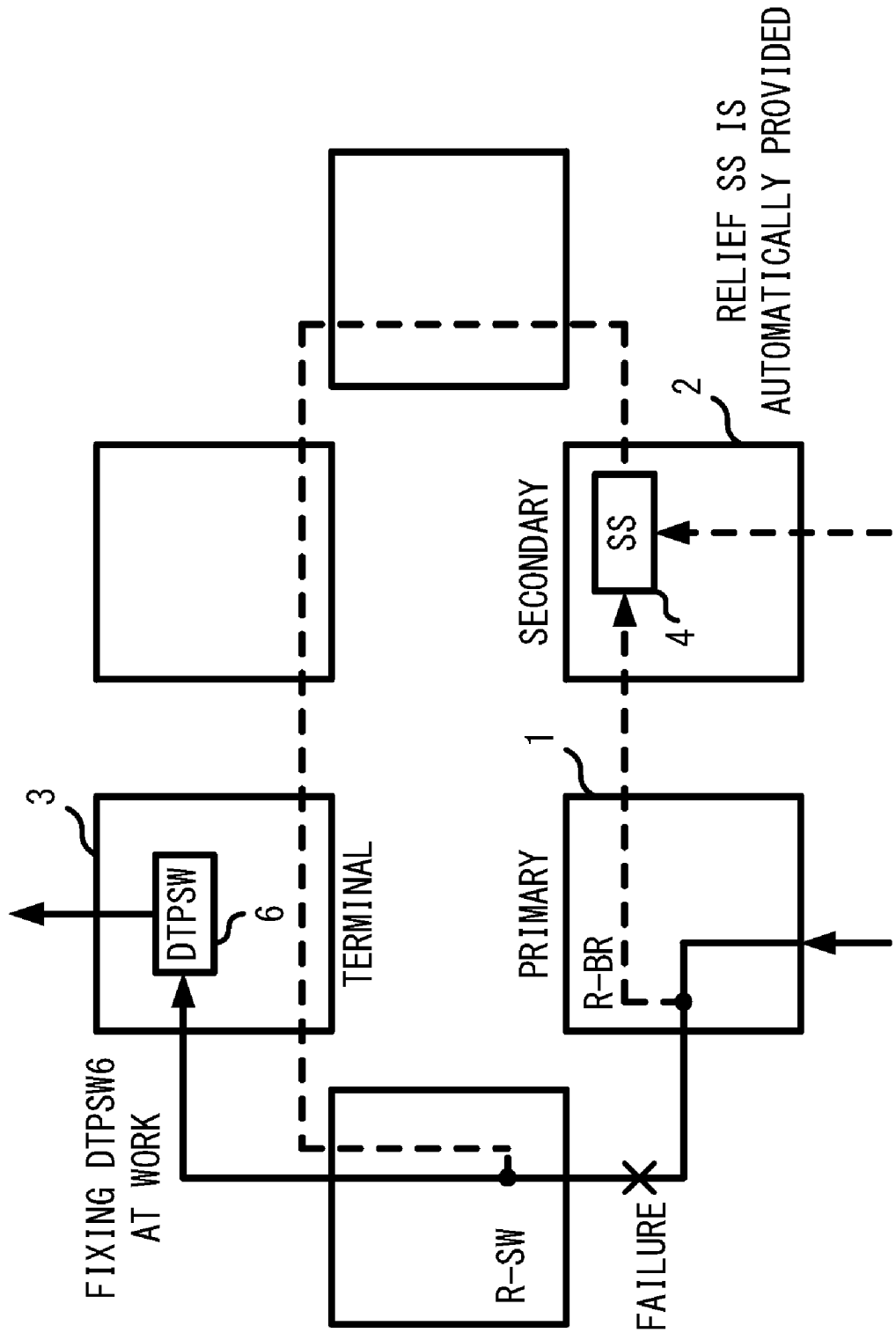

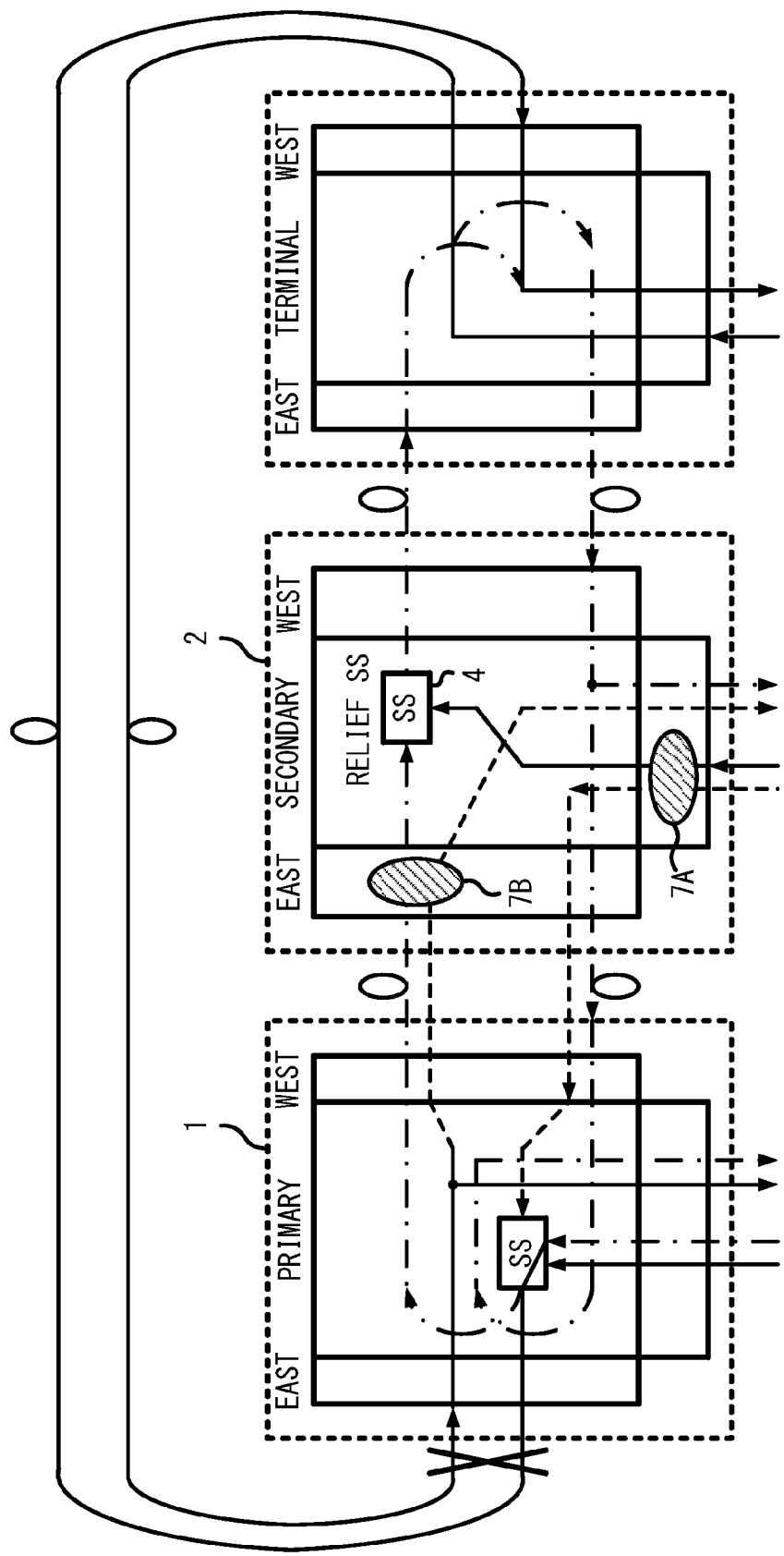

FIG. 11

| SYS | SIDE | CH | | |
|---|---|---|---|---|
| | | DCP RIP-ENH | DTP RIP-ENH | RELIEF DTP-SW |
| 0 | 2 | 1 | 1 | - |
| | | ... | ... | ... |
| | | 24 | 24 | - |
| | | 25 | 25 | 1 |
| | | ... | ... | ... |
| | | 48 | 48 | 24 |
| | 1 | 1 | 1 | - |
| | | ... | ... | ... |
| | | 24 | 24 | - |
| | | 25 | 25 | 1 |
| | | ... | ... | ... |
| | | 48 | 48 | 24 |
| 1 | 2 | 1 | 1 | - |
| | | ... | ... | ... |
| | | 24 | 24 | - |
| | | 25 | 25 | 1 |
| | | ... | ... | ... |
| | | 48 | 48 | 24 |
| ... | ... | ... | ... | ... |
| E | 1 | 1 | 1 | - |
| | | ... | ... | ... |
| | | 24 | 24 | - |
| | | 25 | 25 | 1 |
| | | ... | ... | ... |
| | | 48 | 48 | 24 |
| F | 2 | 1 | 1 | - |
| | | ... | ... | ... |
| | | 24 | 24 | - |
| | | 25 | 25 | 1 |
| | | ... | ... | ... |
| | | 48 | 48 | 24 |
| | 1 | 1 | 1 | - |
| | | ... | ... | ... |
| | | 24 | 24 | - |
| | | 25 | 25 | 1 |
| | | ... | ... | ... |
| | | 48 | 48 | 24 |

| 24CH | CH |
|---|---|
| CTR64 | CTR24 |
| 0 | 0 |
| | ... |
| | 23 |
| 1 | 0 |
| | ... |
| | 23 |
| 2 | 0 |
| | ... |
| | 23 |
| 3 | 0 |
| | ... |
| | 23 |
| 4 | 0 |
| | ... |
| | 23 |
| 5 | 0 |
| | ... |
| | 23 |
| ... | ... |
| 58 | 0 |
| | ... |
| | 23 |
| 59 | 0 |
| | ... |
| | 23 |
| 60 | 0 |
| | ... |
| | 23 |
| 61 | 0 |
| | ... |
| | 23 |
| 62 | 0 |
| | ... |
| | 23 |
| 63 | 0 |
| | ... |
| | 23 |

RIP-ENH SIDE1: USED AS SIDE2 INFORMATION IN BLSR CHG
RIP-ENH SIDE2: USED AS SIDE1 INFORMATION IN BLSR CHG n=0, 1, 2, 3
m=0, 8

NODE APPARATUS INTERCONNECTING RING NETWORK

CROSS-REFERENCE TO RELATED APPLICATION

This application is based upon and claims the benefit of priority of the prior Japanese Patent Application No. 2008-294097, filed on Nov. 18, 2008, the entire contents of which are incorporated herein by reference.

FIELD

The embodiment discussed herein is related to a node apparatus for relieving a failure of a network in which ring networks are interconnected.

BACKGROUND

In a SONET (synchronous optical network)/SDH (synchronous digital hierarchy) network which is a synchronous network, in a BLSR (Bi-Directional Line Switched Ring) network defined in GR-1230, there is a restriction that the number of nodes which can be set in one ring is not more than 16, and a configuration so called Ring Inter Connection is used when constructing a network whose node number exceeds 16.

At this time, in order to efficiently utilize a main signal band, an application for relieving a failure over the ring network (ring failure), such as DCP (Drop & Continue on Protection Channel) or DTP (Dual Transmission Protection Channel) or the like, has been used.

When DCP/DTP configuration (RIP (Ring Interconnection Protection)-Enhance) is built, it is necessary to convert provisioning information for the alarm detecting setting of B3 error related to an SS (Service Selector) switching operation and PDI (payload defect indicator)/PLM (payload mismatch)/TIM (trace identifier mismatch) so as to be adapted to a traffic that is to be actually relieved.

DCP/DTP

FIGS. 1A and 1B are diagrams illustrating a DCP operation.

FIGS. 2A and 2B are diagrams illustrating a DTP operation.

In DCP, DTP which is a ring interconnection that is supported by BLSR of 2 fibers or 4 fibers, when BLSR network failure is generated, an SS is automatically provided in a secondary node 2 according to the link where the BLSR network failure is generated. The automatically provided SS is referred to as a relief SS (relieving type SS). There is a case that the relief SS is provided and there is a case that the relief SS is not provided depending on the link where the BLSR network failure is generated (see SS 4 of FIG. 1A, FIG. 2A).

Further, in a DCP, DTP, a normal SS provided in a primary mode 1 is referred to as a regular SS. That is, the different names are used as the situation demands in order to separate with the relief SS. When simply expressed as SS, the SS denotes the regular SS in general (see SS 5 of FIGS. 1A-1B).

In the BLSR network, when ring failure is generated, a protection channel (line) is used for relieving a work line, so that a channel (PCA ch) accessing to a protection line generally ceases the access (case 1).

However in the DCP, DTP, there is a case that relieving of other work channel is not disturbed even when accessing to a protection channel is not ceased, and in such a case, accessing to the protect channel is continued (case 2).

Further, there is a case that a signal bridged to a protection channel by a ring bridge (R-BR) in a switching node is the same as a signal that have been accessed to a protection channel in the secondary node 2 of the original DCP or DTP configuration, and the relief SS 4 is formed in such a case (case 3).

In the DCP, DTP, the secondary node 2 executes any one of the aforementioned cases 1 to 3 depending on a link where a network failure is occurred.

As for the primary node 1 and a terminal node 3, the operation is not changed even when the network failure is occurred anywhere in the ring, and the primary node 1 of the DCP fixes the regular SS 5 at INS (insertion) side. The terminal node 3 of the DTP fixes a DTP-SW 6 at the work side.

The other functions are the same as the normal BLSR functions, and a PCA (Protection Channel Access) cease and a protection channel through are executed, and the switching node executes a ring bridge (R-BR) and a ring switch (R-SW).

Alarm Detection Setting Conversion

FIG. 3 is a diagram illustrating an alarm detection setting convert in the DCP.

In the BLSR, when a ring failure, a failure over a ring network, is occurred, a protection line is used for relieving the work line. In the DCP/DTP configuration, a signal bridged to a protection channel by the ring bridge in the switching node may be the same signal which has been accessed to a protection channel in the secondary node 2 of the original DCP or DTP configuration, and in this case, the relief SS 4 is formed.

When determining a switching operation of the relief SS 4, an alarm detection setting which is a setting of a threshold value or the like for detecting the alarm of B3 (error monitoring of path)/C2 (Path Signal Label)/J1 (path trace) in POH (Path OverHead) of SONET/SDH requires PCA (Protection Channel Access) which has been input in the secondary node 2 before the ring switch is switched as a dedicated setting of another relief SS.

This is apparent by comparing the route before the ring switch is switched illustrated in a solid line and the route at the time when a relief SS is activated after the ring switch is switched illustrated in a chain line as shown in FIG. 3.

That is, this is because that a main signal of a protection channel input in the secondary node 2 at a normal time and a main signal input in the relief SS 4 at a relieving time is absolutely different in content although physical input channels are the same.

In FIG. 3, the PCA (broken line) that is a signal input to East side of the secondary node 2 before the ring switch is switched and a circuit signal (chain line) after the ring switch is switched are different data signals. Accordingly, it is necessary that detection setting of the alarm which is detected as a switching trigger is also respectively set to be appropriate for detection.

The input signal at East side of the secondary node 2 after the ring switch is switched is the same as an input signal of a ring interconnection side of the secondary node 2 before the ring switch is switched. In the secondary node 2, an alarm detection setting 7A at the ring interconnection side may be converted and used as an alarm detection setting 7B at East side after the ring switch is switched.

FIG. 4 is a diagram illustrating an alarm detection setting converted in the DTP. In the diagram, the route before the ring switch is switched is illustrated by a solid line, and the route when the relief SS is activated after the ring switch is switched is illustrated by a chain line.

Also in the case of the DTP configuration, basically similar to the case of the DCP, in the secondary node 2, the input signal at East side after the ring switch is switched is the same as the ring interconnection side input signal before the ring switch is switched. In the secondary node 2, an alarm detection setting 8A at the ring interconnection side may be used as an alarm detection setting 8B at East side after the ring switch is switched.

FIG. 5 is a diagram illustrating a block diagram of an example of a conventional node apparatus. In the diagram, the node apparatus 10 includes interface cards 11-1 to 11-$m$, 12-1 to 12-$m$, a work SF (Switch Fabric) 13, and a protection SF (Switch Fabric) 14. The SF's 13, 14 are necessary to provide the circuit by a synchronous transmission signal STS-1 unit, illustrated as STS-SF in diagrams.

A RIP control part 16 provided in the SEs 13, 14, identifies DCP/DTP by soft setting information such as DCP, DTP, or the like and by a RIP (routing information protocol) table in which a span (from primary node to terminal node) passed by each channel is registered and judges whether or not a relief SS is activated.

A RIP conversion part 17 converts a detection setting of B3/C2/J1 alarm in a path alarm detection part 18 by controlling of the RIP control part 16.

Note that an alarm processing technique for eliminating the circuit size of hardware in an ADM device having the BLSR function equipped with a service selector has been known in Japanese Laid-open Patent Publication No. 11-122269.

The speed and the capacity of transmission signal have been increased with recent increase of transmission information quantity. The circuit size has been also increased with the increase. Under the circumstance, the setting space and power consumption of a node apparatus is increased in proportion to the increase of capacity.

In the conventional node apparatus, since the RIP conversion part 17 and the path alarm detection part 18 which are dedicated hardware circuits are provided in the SF's 13, 14 in a concentrated manner, so that it is basically necessary to provide the circuit by a synchronous transmission signal STS-1 unit, and there is a restriction when increasing the processing capacity to the requirement of the increase of capacity.

SUMMARY

According to an aspect of the embodiment, there is provided a node apparatus having a plurality of interface units for interfacing to a transmission line, switch units of a work system and a protection system for switching signals of the transmission line, and a service selector used to relieve a network failure over ring networks interconnected by node apparatuses, the node apparatus including a first controller for controlling the service selector in the switch units, and a second controller for controlling setting information of alarm detection in case of using the service selector in the interface units.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 2A and 2B are diagrams illustrating a DTP operation;

FIG. 3 is a diagram illustrating an alarm detection setting convert in the DCP;

FIG. 11 is a diagram illustrating a BLSR change;

DESCRIPTION OF EMBODIMENT

Hereinafter, an embodiment will be described based on drawings.

Embodiment

Node Apparatus

Figure 1A:
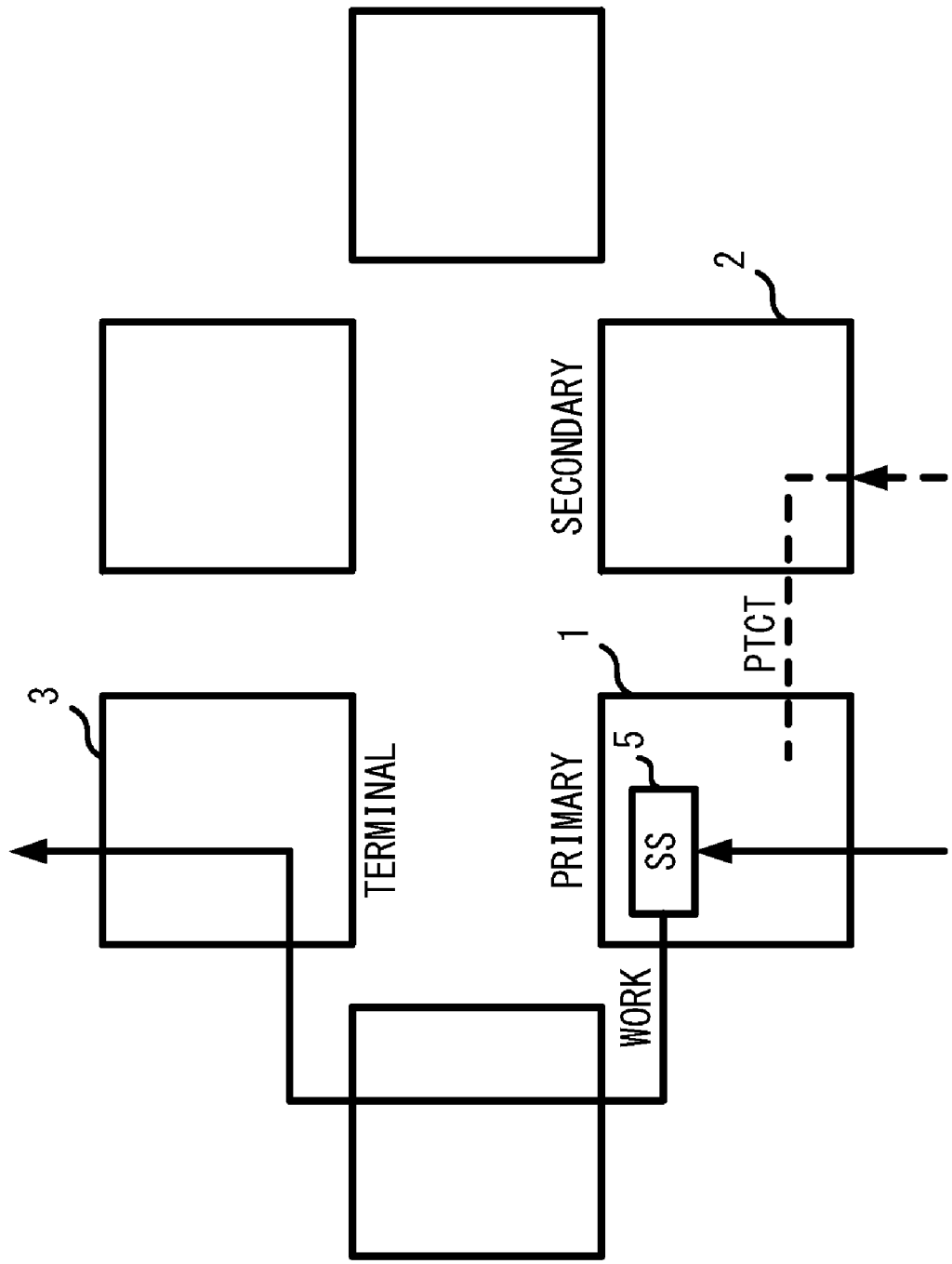
FIGS. 1A and 1B are diagrams illustrating a DCP operation.
Figure 1B:
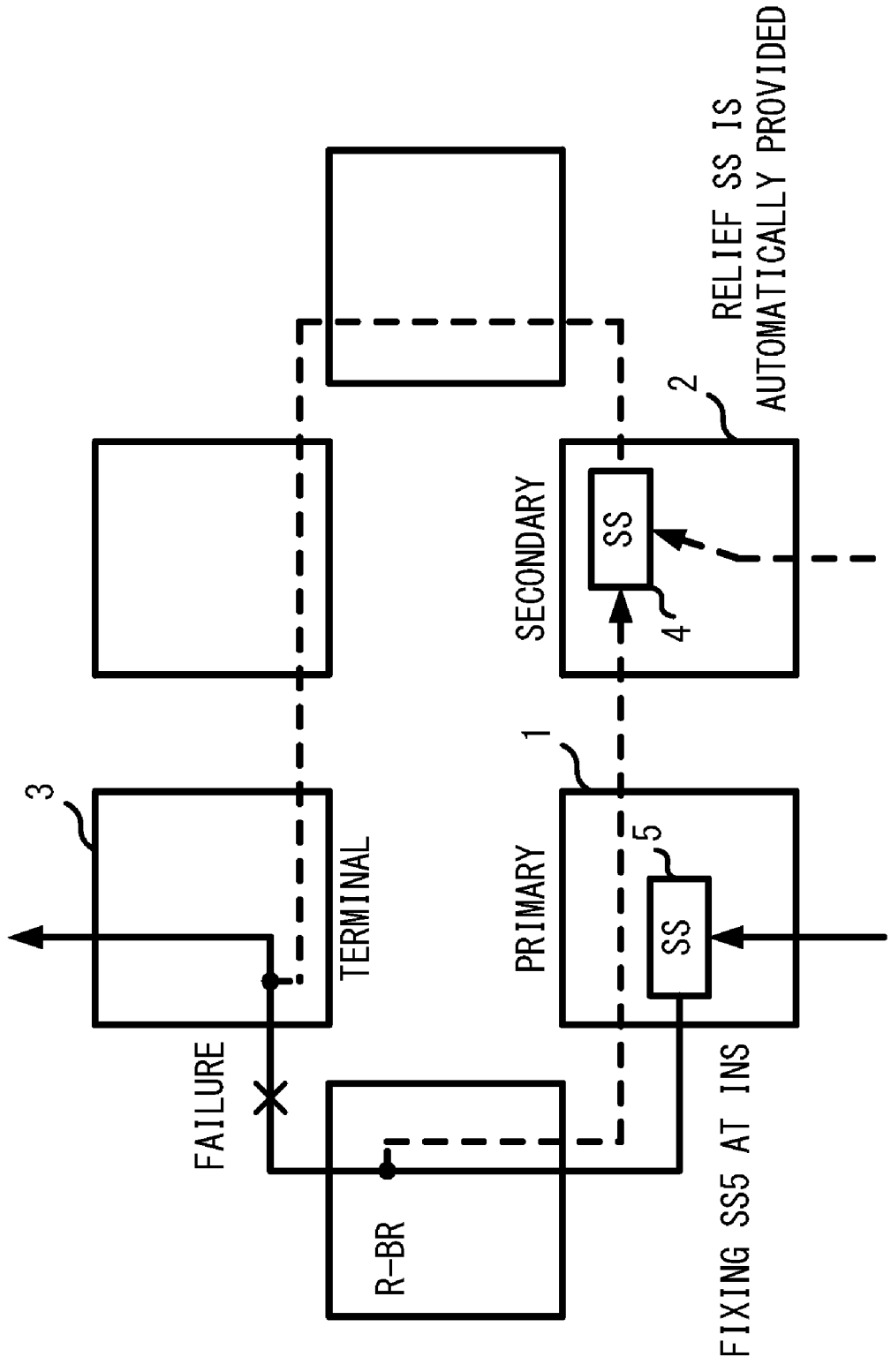
Figure 2A:
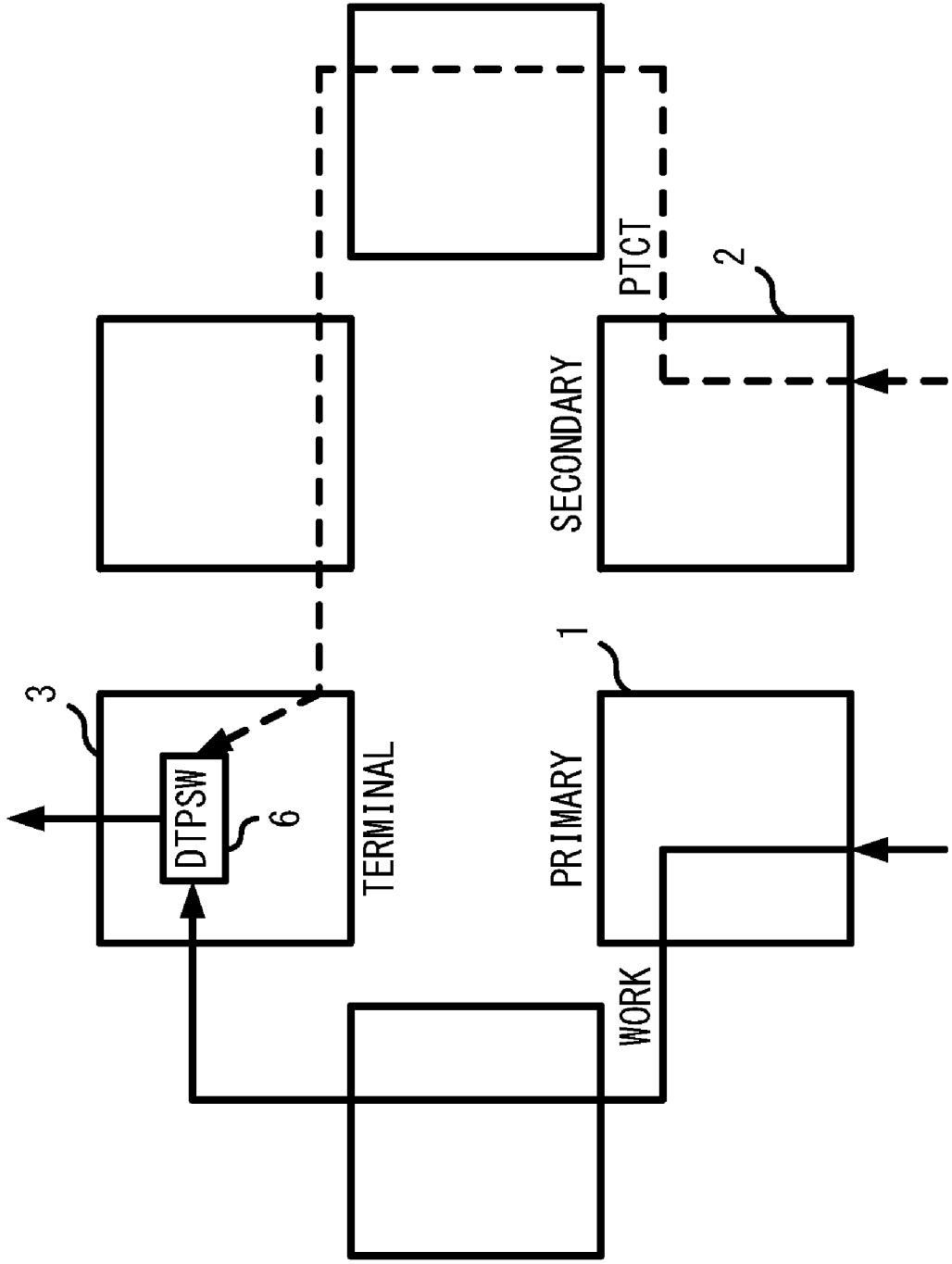
Figure 4:
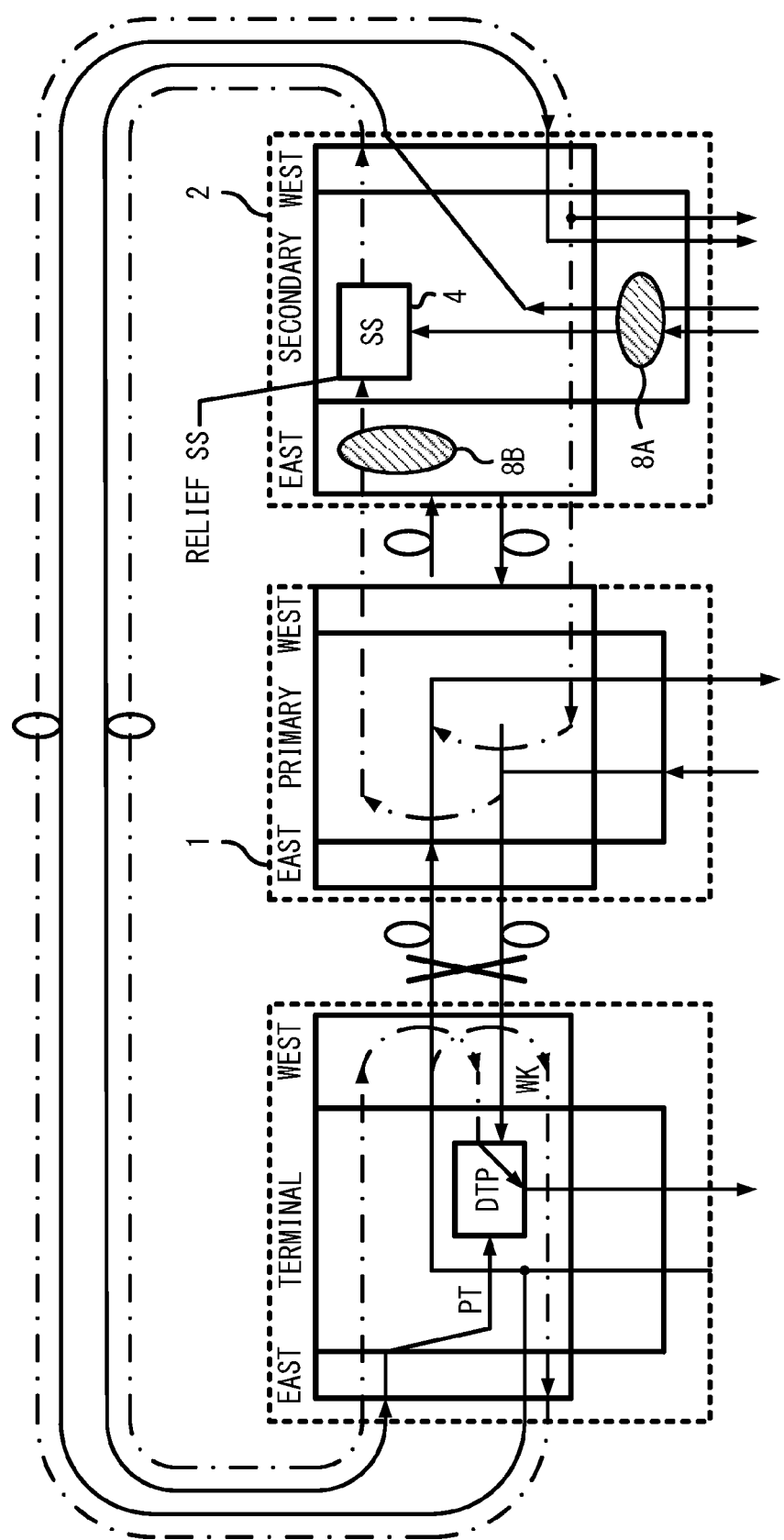
FIG. 4 is a diagram illustrating an alarm detection setting converted in the DTP.
Figure 5:
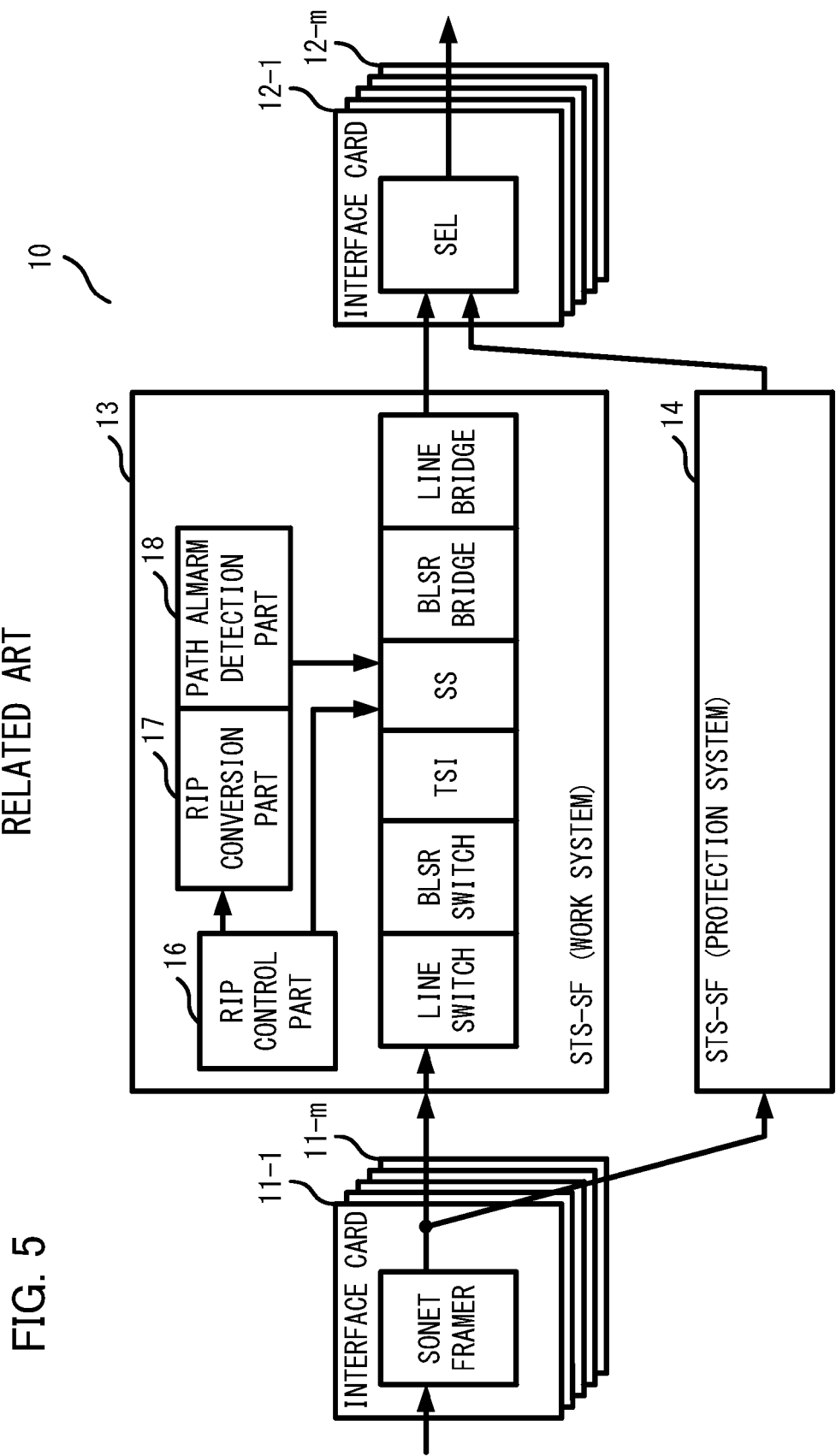
FIG. 5 is a diagram illustrating a block diagram of an example of a conventional node apparatus.
Figure 6:
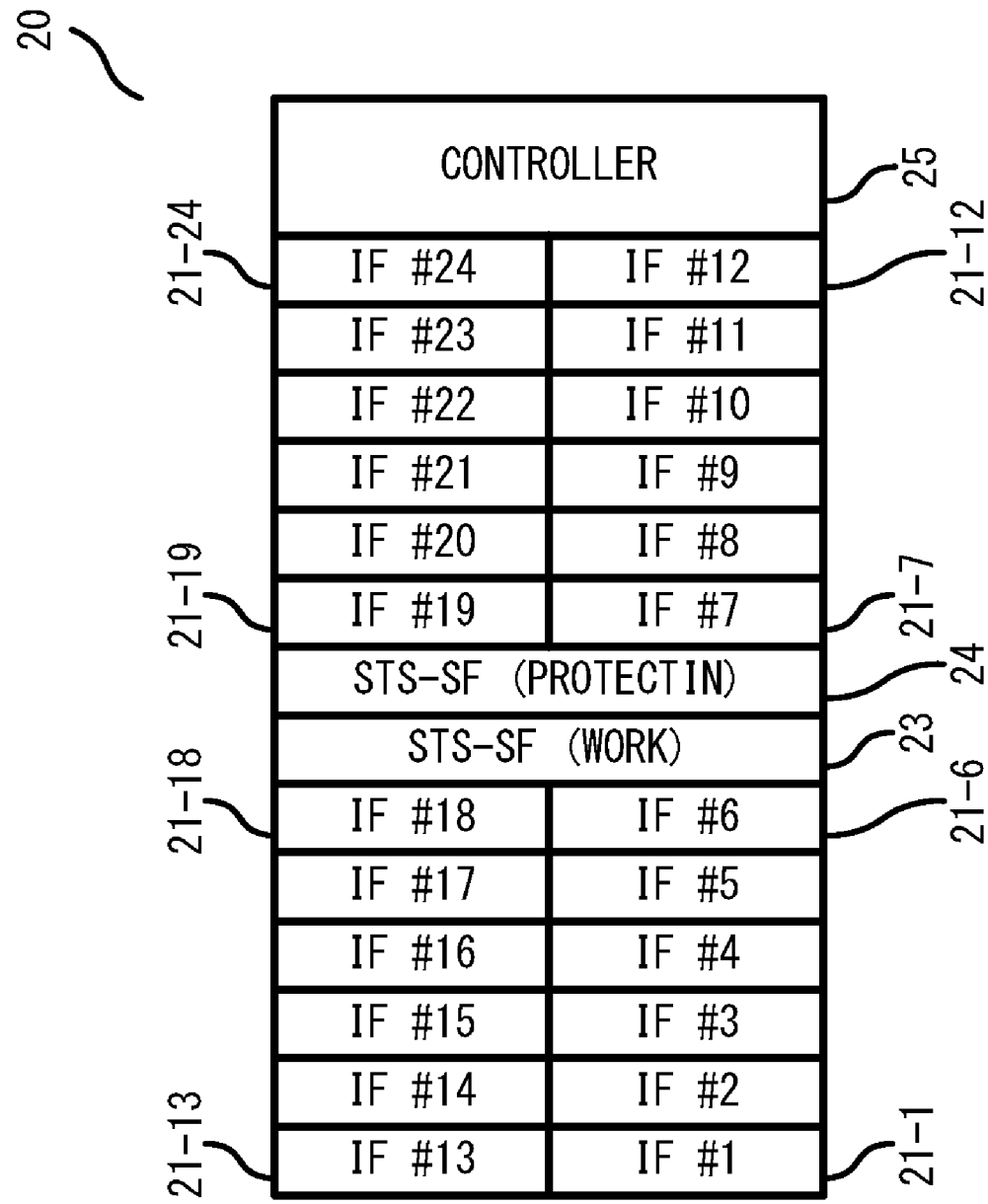
FIG. 6 is diagram illustrating a configuration of an embodiment of a node apparatus.

FIG. 6 is a diagram illustrating a configuration of an embodiment of a node apparatus.

Figure 7:
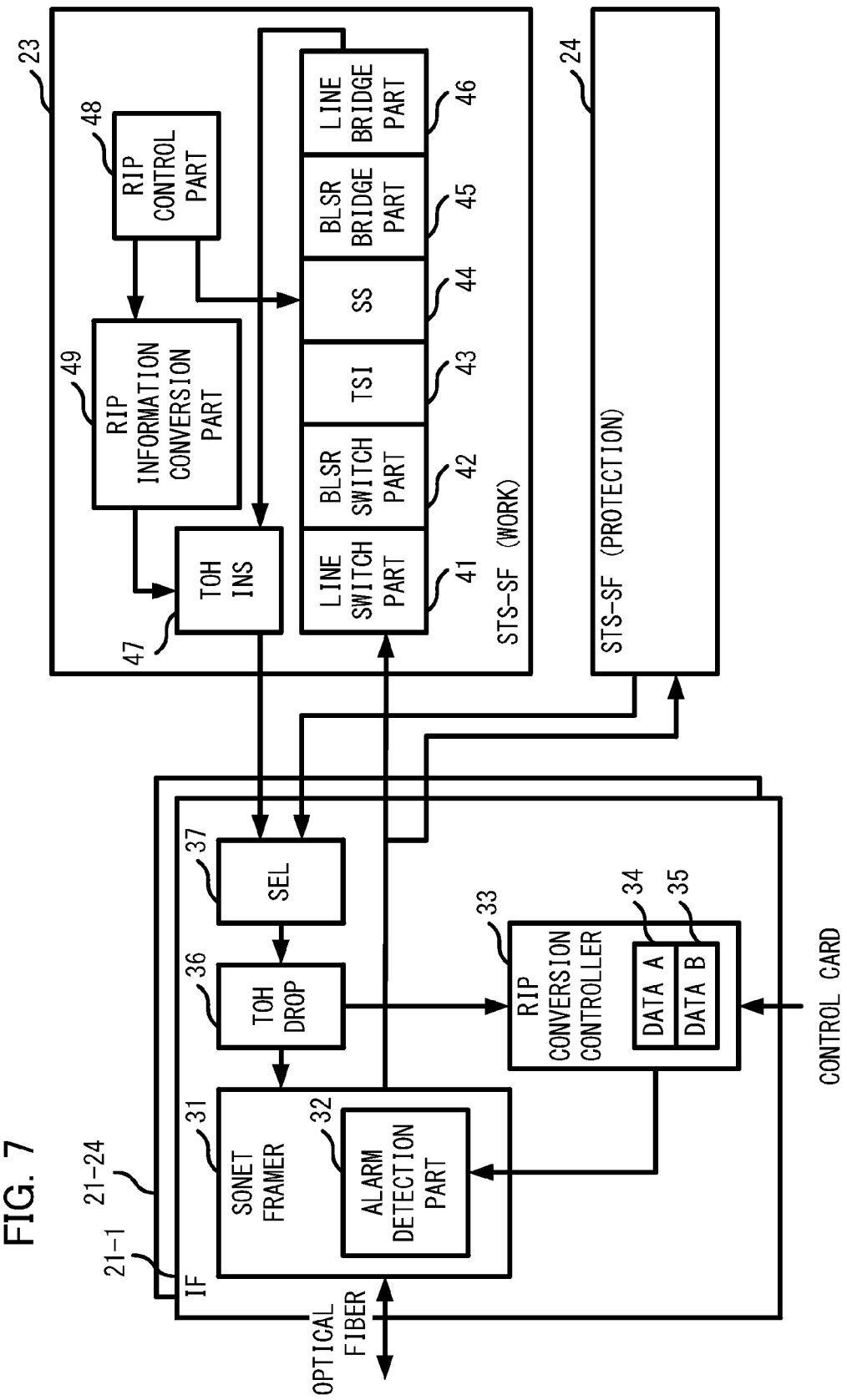
FIG. 7 is a diagram illustrating a block diagram of an embodiment of the node apparatus.

FIG. 7 is a diagram illustrating a block diagram of the embodiment of the node apparatus.

In FIGS. 6, 7, the node apparatus 20 includes interface cards 21-1 (IF#1) to 21-24 (IF#24) for interfacing with a transmission line as a interface unit, and switch fabrics (STS-SF) 23, 24 for switching the transmission line signal as a switch unit, and a control card (controller) 25 for controlling the node apparatus 20.

The switch fabric 23 for work is mutually connected with the interface cards 21-1 to 21-24 by a back plate board not illustrated, illustrated as STS-SF (WORK) in diagrams. Further, the switch fabric 24 for protection (PTCT) is mutually connected with the interface cards 21-1 to 21-24 by the back plate board, illustrated as STS-SF (PTCT) in diagrams.

The control card 25 is mutually connected with the interface cards 21-1 to 21-24 and the switch fabrics 23, 24, and executes control of the entire node apparatus 20.

In FIG. 7, the interface card (IF#1) 21-1 to the interface card (IF#24) 21-24 execute a transmission/reception processing of, for example, an optical signal of SONET/SDH. An input optical signal is subjected to a photoelectric conversion processing and a serial/parallel conversion processing, and is supplied to a SONET framer 31. Further, an output signal output from the SONET framer 31 is subjected to a parallel/serial conversion processing and a photoelectric conversion processing, and is transmitted to an optical fiber.

The SONET framer 31 includes an alarm detection part 32. The alarm detection part 32 detects an alarm of B3 (error monitoring of path)/C2 (information identification of path)/

J1 (path trace) in POH of input signal. A threshold value for detecting the alarm is supplied from a RIP conversion controller 33.

The RIP conversion controller 33 having a RIP conversion function includes a normal time register 34 for holding a setting data for alarm detection (provisioning information: data A) at a normal time, and a relief time register 35 for holding a setting data for alarm detection (provisioning information: data B) at a relief SS time when the relief SS is provided. And the RIP conversion controller 33 switches any of the setting data for alarm detection at a normal time and the setting data for alarm detection at a relief SS time and supplies to the alarm detection part 32 by the channel unit. For example, the aforementioned setting data for alarm detection at a normal time and the setting data for alarm detection at a relief SS time are threshold values, used for detecting alarm, and are set from a CPU in the control card 25.

The switching control is executed based on RIP information (information for relief SS enhancement) as activation information of relieving the ring failure separated by a transport overhead separation part (TOH DROP) 36 by the channel unit.

Note that a selector (SEL) 37 executes switching of a work signal and a protection signal, and selects an output SONET signal of any one of the STS-SFs 23, 24 and supplies to the TOH DROP 36.

Note that in the embodiment, the description is made for SONET as an example, the minimum unit of the channel is synchronous transfer signal STS-1 frame of SONET. Further, a transport overhead in SONET corresponds to a section overhead of SDH, and a section overhead in SONET corresponds to Regenerator Section Over Head (RSOH) of SDH, and a line overhead in SONET corresponds to Multiplex Section Over Head (MSOH) of SDH.

A SONET signal output from the SONET framer 31 is supplied to the switch fabrics 23, 24 for work and protection. The switch fabrics 23, 24 execute switch control of a main signal, and the main signal is switched by a BLSR switch part 42, and thereafter subjected to a cross connect processing in a cross connect part (TSI) 43. Then, the main signal is switched by a service selector part (SS) 44, and is branched by a line bridge part 45 and a BLSR bridge part 46, and is supplied to a transport overhead insertion part (TOH INS) 47.

A RIP control part 48 determines whether the relief SS is activated or not by identifying the DCP or DTP based on soft setting information of the DCP, DTP, or the like preliminarily internally set and a RIP table in which a span (from primary node to terminal node) passed by each channel is registered. And the RIP control part 48 generates RIP information, and executes switching control of the SS 44 when activating the relief SS. At the same time, the RIP information is supplied to a RIP information conversion part 49.

The RIP control part 48 executes generation of RIP information by a sys-number rule indicating the switch processing unit of the switch fabric. Consequently, the RIP information conversion part 49 converts the RIP information into a slot rule which is alignment of the time slot of the SONET signal to be output and which indicates the signal processing unit of the interface card in order to transfer to the interface card at the input side by multiplexing the RIP information for every time slot of the SONET signal to be output, and supplies to the TOH INS 47.

The TOH INS 47 inserts the RIP information converted into the aforementioned slot rule in, for example, a free byte following B1 byte of a section overhead of the SONET signal to be output and supplies to the interface cards 21-1 to 21-24.

Interface Card and RIP Information Interchange Unit

Figure 8:
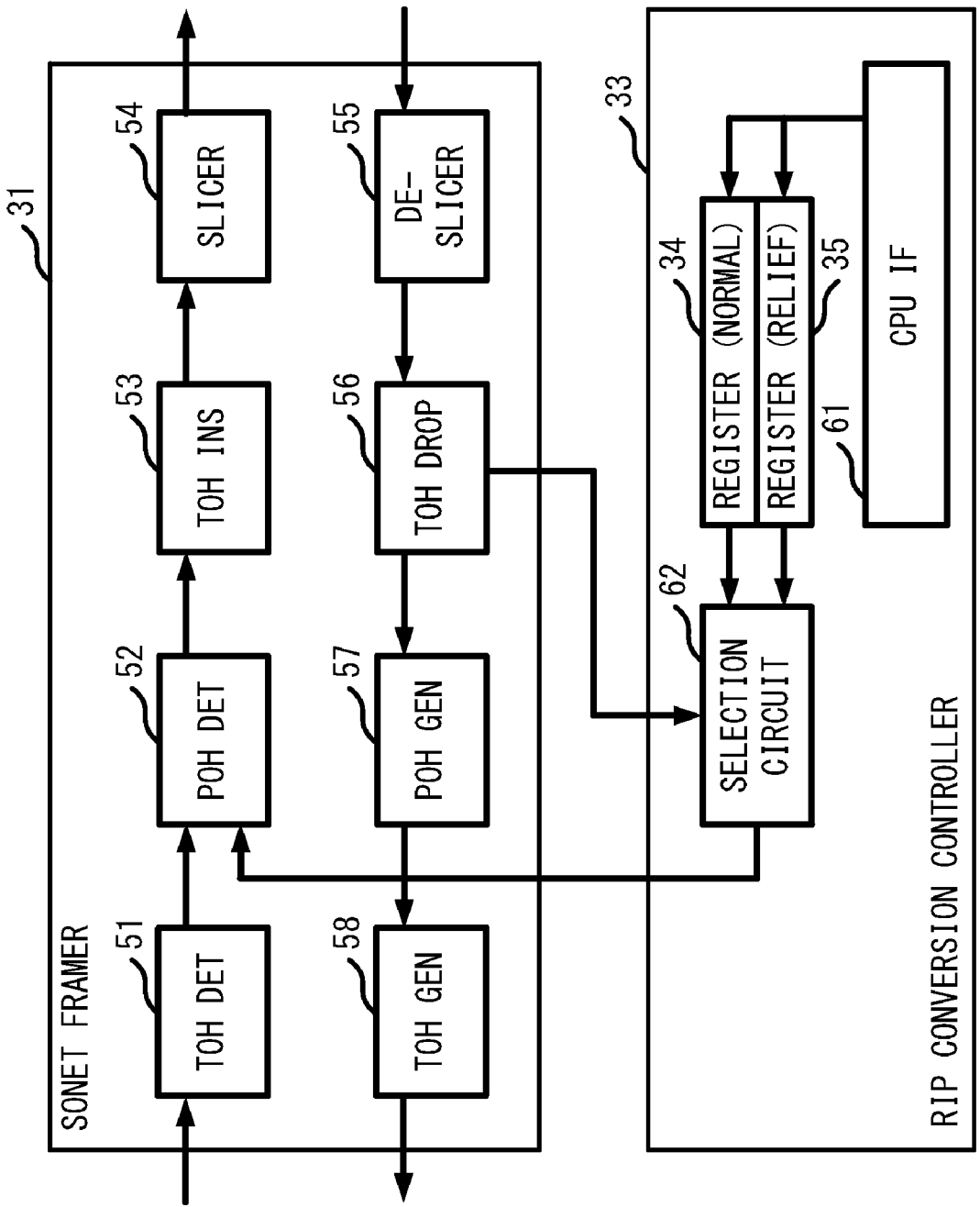
FIG. 8 is a diagram illustrating a block diagram of an embodiment of an interface card and a RIP conversion controller.

FIG. 8 is a diagram illustrating a block diagram of an embodiment of the interface card and the RIP conversion controller. In the diagram, a transport overhead detection part (TOH DET) 51 of the SONET framer 31 executes detection processing of the section overhead and the line overhead of the input signal, and a path overhead detection part (POH DET) 52 executes detection processing of a path overhead. The alarm detection part 32 for detecting B3/C2/J1 is provided in the POH DET 52.

A transport overhead insertion part (TOH INS) 53 provided to the next executes insertion processing of the section overhead and the line overhead, and a slicer 54 executes a bit slice conversion processing so as to match with the interface of the switch fabric and supplies the SONET signal to the switch fabrics 23, 24.

A de-slicer 55 executes a reverse conversion processing of the bit slice of the SONET signal supplied from the switch fabrics 23, 24.

A transport overhead separation unit (TOH DROP) 56 (corresponding to TOH DROP 36 of FIG. 7) separates RIP information (information for relief SS enhance) from, for example, a free byte following B1 bite of the section overhead and supplies to a selection circuit 62 in the RIP conversion controller 33 and supplies the main signal to a path overhead generation part (POH GEN) 57.

The POH GEN 57 generates a path overhead and adds the path overhead to the main signal.

A transport overhead generation part (TOH GEN) 58 generates a transport overhead and adds the transport overhead to the main signal and outputs as a SONET signal.

In the RIP conversion controller 33, provisioning information is supplied from a CPU in the controller 25 to a CPU interface part (CPU INF) 61, and provisioning information including the setting data for alarm detection at a normal time is held by normal time register 34, and the provisioning information including the setting data for alarm detection at the relief time SS when the relief SS is provided, is held by the relief time register 35.

The selection circuit 62 holds RIP information (information for relief SS enhance) supplied from the TOH DROP 56 by a channel unit. And the selection circuit 62 selects the setting data for alarm detection at a normal time in the case where the RIP information (information for relief SS enhance) is, for example, value zero by the channel unit, and selects the setting data for alarm detection at the relief SS time in the case of value one, and supplies to the alarm detection part 32 in the POH DET 52.

The alarm detection part 32 detects the alarm of B3/C2/J1 in POH of the input signal by using the supplied the setting data for alarm detection.

Herewith, distributed processing can be executed by the interface cards 21-1 to 21-24 and the switch fabrics 23, 24, and a configuration having expandability by which it becomes possible to easily cope with increase of capacity is provided.

RIP Information Conversion Part

Figure 9:
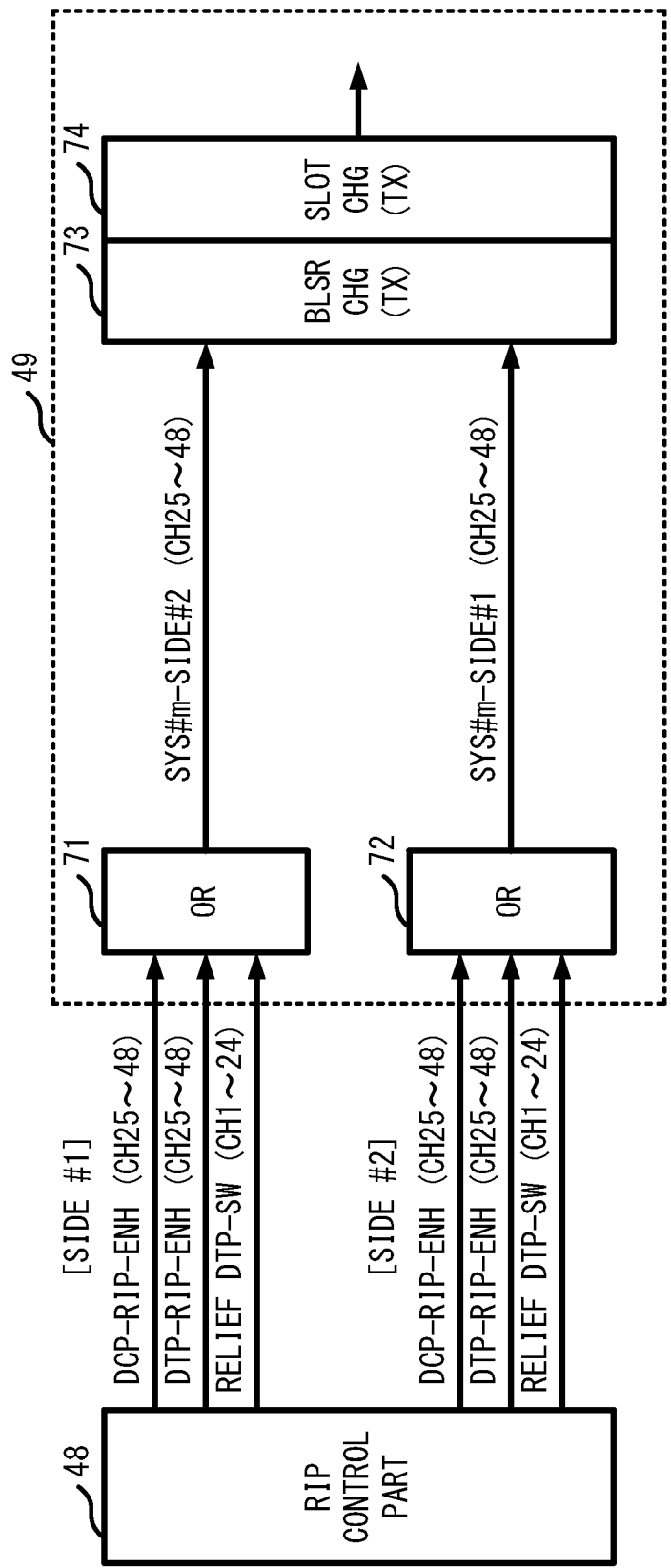
FIG. 9 is a diagram illustrating a block diagram of an embodiment of the RIP information conversion part.

FIG. 9 is a diagram illustrating a block diagram of an embodiment of the RIP information conversion part 49. In the diagram, the RIP control part 48 outputs any of DCP-RIP-ENH (CH25 to 48) which is RIP information of the DCP of a protection channel, DTP-RIP-ENH (CH25 to 48) which is RIP information of the DTP corresponding to 24 channels, or relief DTP-SW (CH1 to 24) which is the rest of the RIP information with respect to each of East side (side #1) and West side (side #2) as RIP information. Note that since DCP- RIP-ENH (CH1 to 24), DTP-RIP-ENH (CH1 to 24) are work channels, it is prohibited that every channel is converted by zero.

An OR (logical disjunction) circuit (OR) 71 in the RIP information conversion part 49 executes OR operation of DCP-RIP-ENH (CH25 to 48), DTP-RIP-ENH (CH25 to 48), relief DTP-SW (CH1 to 24) at East side, and obtains any one type of RIP information (for example, DCP-RIP-ENH), and supplies to a BLSR change part (BLSR CHG) 73 as RIP information (CH25 to 48) at West side.

Further, an OR (logical disjunction) circuit (OR) 72 executes OR operation of DCP-RIP-ENH (CH25 to 48), DTP-RIP-ENH (CH25 to 48), relief DTP-SW (CH1 to 24) at West side, and obtains any one type of RIP information (for example, DCP-RIP-ENH) and supplies to the BLSR CHG 73 as RIP information (CH25 to 48) at East side.

The BLSR CHG 73 changes the alignment of the RIP information (BLSR change) based on BLSR information which is configuration information of the ring network. Further, a slot change part (SLOT CHG) 74 changes the alignment of RIP information output from the BLSR CHG 73 based on slot information which is physical configuration information of the node apparatus. Herewith, the RIP information is converted to the alignment of the time slot of the SONET signal to be output and is supplied to the TOH INS 47.

BLSR Change Part (BLSR CHG)

Figure 10:
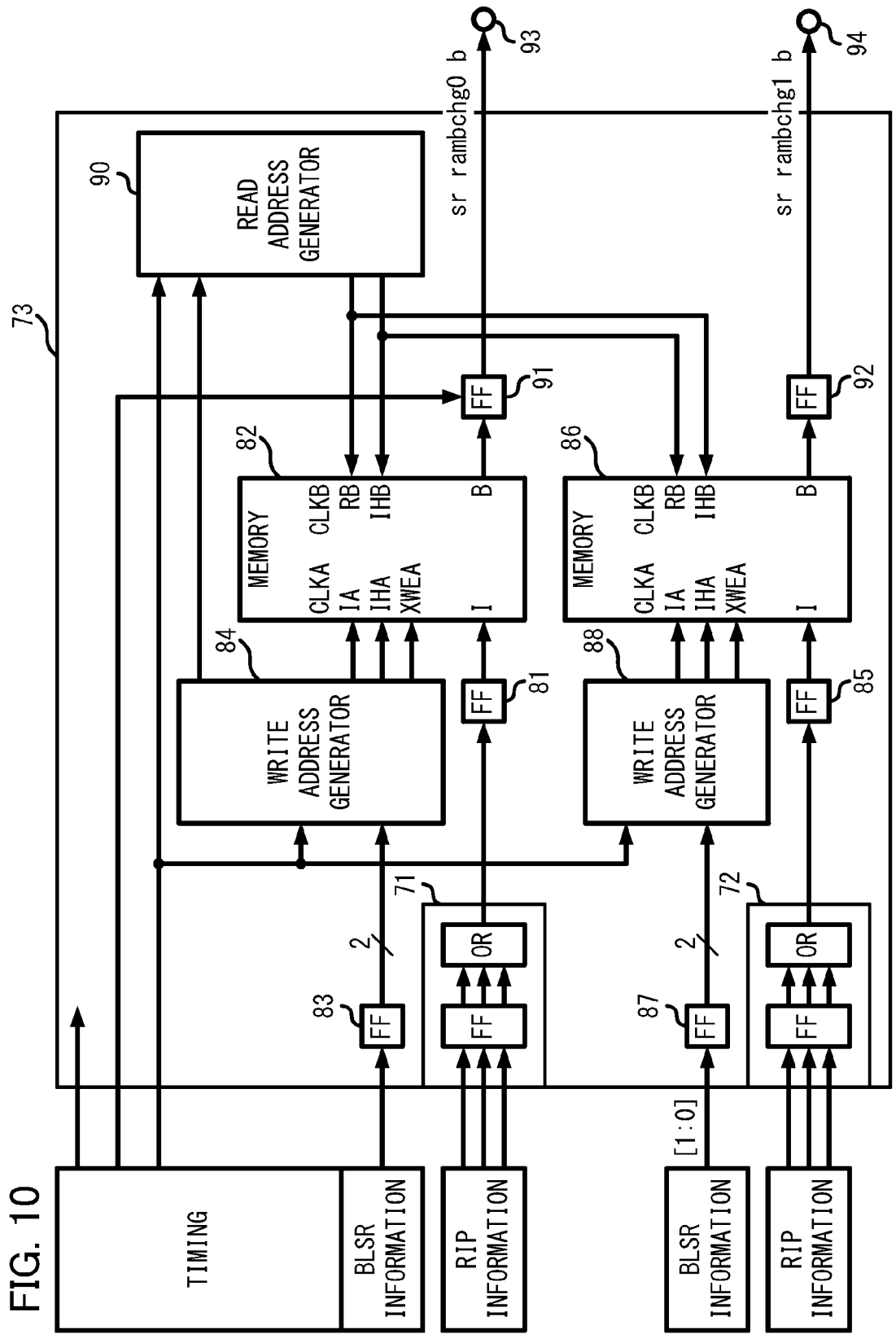
FIG. 10 is a diagram illustrating a block diagram of an embodiment of an OR circuit and a BLSR change part.

FIG. 10 is a diagram illustrating a block diagram of an embodiment of the OR 71, 72 and the BLSR CHG 73. In the diagram, DCP-RIP-ENH (CH25 to 48), DTR-RIP-ENH (CH25 to 48), relief DTP-SW (CH1 to 24) at East side are supplied to the OR 71, and synchronized in a flip flop (FF) and subjected to OR operation, and synchronized in a flip flop (FF) 81 and supplied to a two port memory (MEMORY) 82 as the RIP information (CH25-48) at East side.

Further, the BLSR information of two bits is synchronized by a flip flop (FF) 83, and is supplied to a write address generator 84. The write address generator 84 generates a write address based on a timing signal and the aforementioned BLSR information and supplies to the memory 82. The write address is the value associated with the BLSR information, and the RIP information (CH25 to 48) at West side is written in the memory 82 at an address associated with the BLSR information.

Similarly, DCP-RIP-ENH (CH25 to 48), DTR-RIP-ENH (CH25 to 48), relief DTP-SW (CH1 to 24) at West side are supplied to the OR 72, and synchronized in a flip flop (FF) and subjected to OR operation, and synchronized in a flip flop (FF) 85 and supplied to a two port memory (MEMORY) 86 as the RIP information (CH25-48) at East side.

Further, the BLSR information of two bits is synchronized by a flip flop (FF) 87, and is supplied to a write address generator 88. The write address generator 88 generates a write address based on a timing signal and the aforementioned BLSR information and supplies to the memory 86. The write address is the value associated with the BLSR information, and the RIP information (CH25 to 48) at East side is written in the memory 86 at an address associated with the BLSR information.

A read address generator 90 generates a read address for synchronizing the memories 82, 86 based on a timing signal for sequential read, and supplies to the memories 82, 86. Herewith, the RIP information (CH25-48) at West side, East side in which channels are arranged in accordance with the configuration of BLSR is read from the memories 82, 86 and output from terminals 93, 94.

Incidentally, BLSR information of two bits indicates two fiber BLSR of OC-48 by "00", indicates two fiber BLSR of OC-192 by "01", indicates two fiber BLSR of OC-768 by "10", and indicates four fiber BLSR of OC-192 or OC-768 by "11".

The RIP control part 48 illustrated in FIG. 7 outputs RIP information of sys-number rule in which logical number is attached to a time slot as illustrated in FIG. 11. Sys numbers of 0 to F (hexadecimal) are attached for every side 1 (East side), side 2 (West side) of 48 channels. Note that among the aforementioned 48 channels, 0 to 24 channels are work channels and 25 to 48 channels are protection channels.

Figure 12:
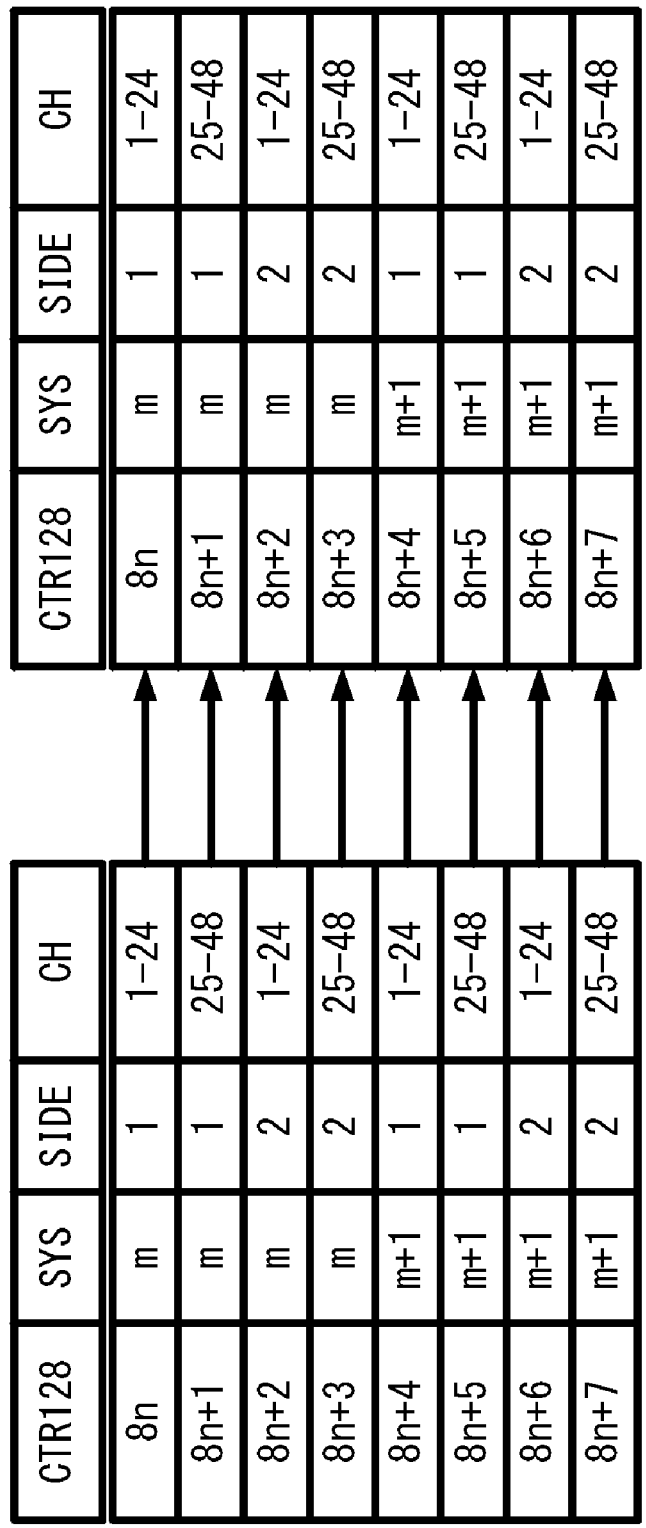
FIG. 12 is a diagram illustrating a BLSR change.

In the case (2F-BLSR of OC-48) where the BLSR information is "00", the setting unit is considered as channels corresponding to 4 sys (=386 channels), and as illustrated in FIG. 12, the read address of 128-adic counter (CTR 128) illustrated at right side is regarded as the same as the write address of 128-adic counter (CTR 128) illustrated at left side.

Figure 13:
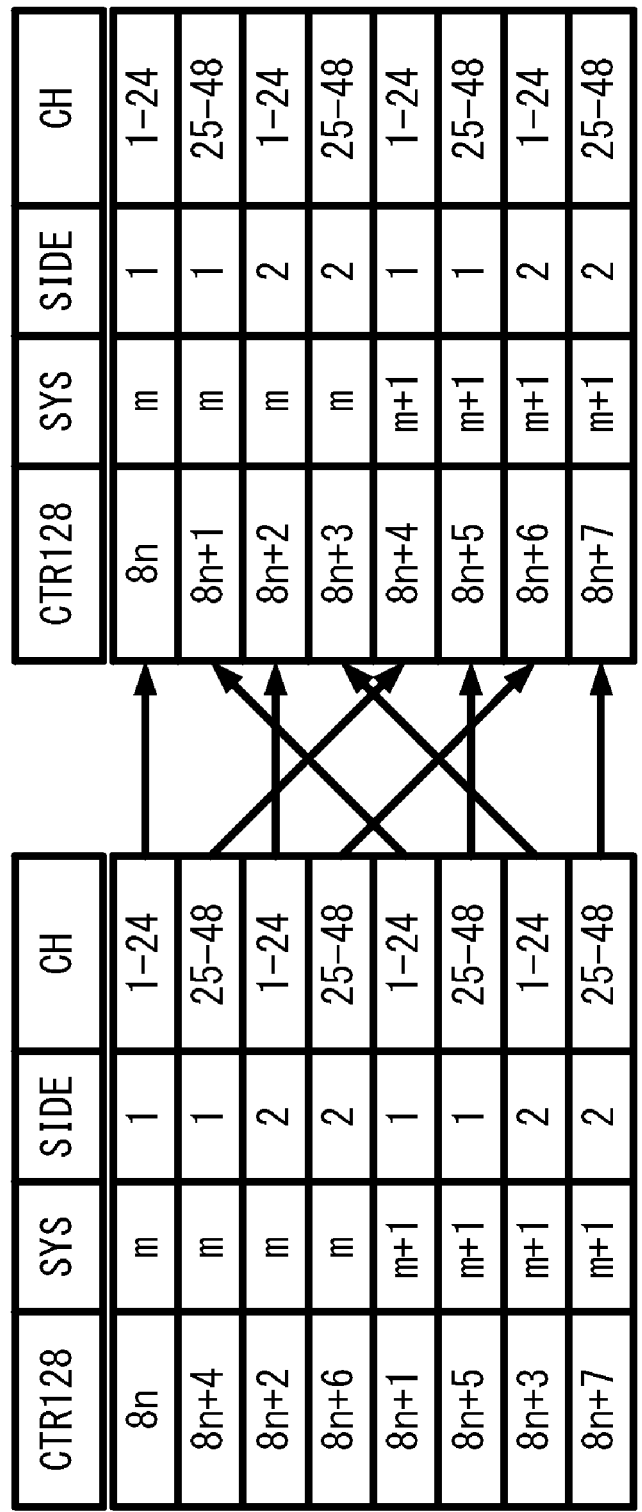
FIG. 13 is a diagram illustrating a BLSR change.

In the case (2F-BLSR of OC-192) where the BLSR information is "01", the setting unit is considered as channels corresponding to 4 sys (=384 channels), and as illustrated in FIG. 13, a read address of 128-adic counter (CTR 128) illustrated at right side is generated with respect to the write address of 128-adic counter (CTR 128) illustrated at left side. That is, [2:0] of three bits of the low-order of the read address of the memory are interchanged to [0], [1], [2] in the write address, thereby converting into alignment of the output of the BLSR change (BLSR CHG).

Figure 14:
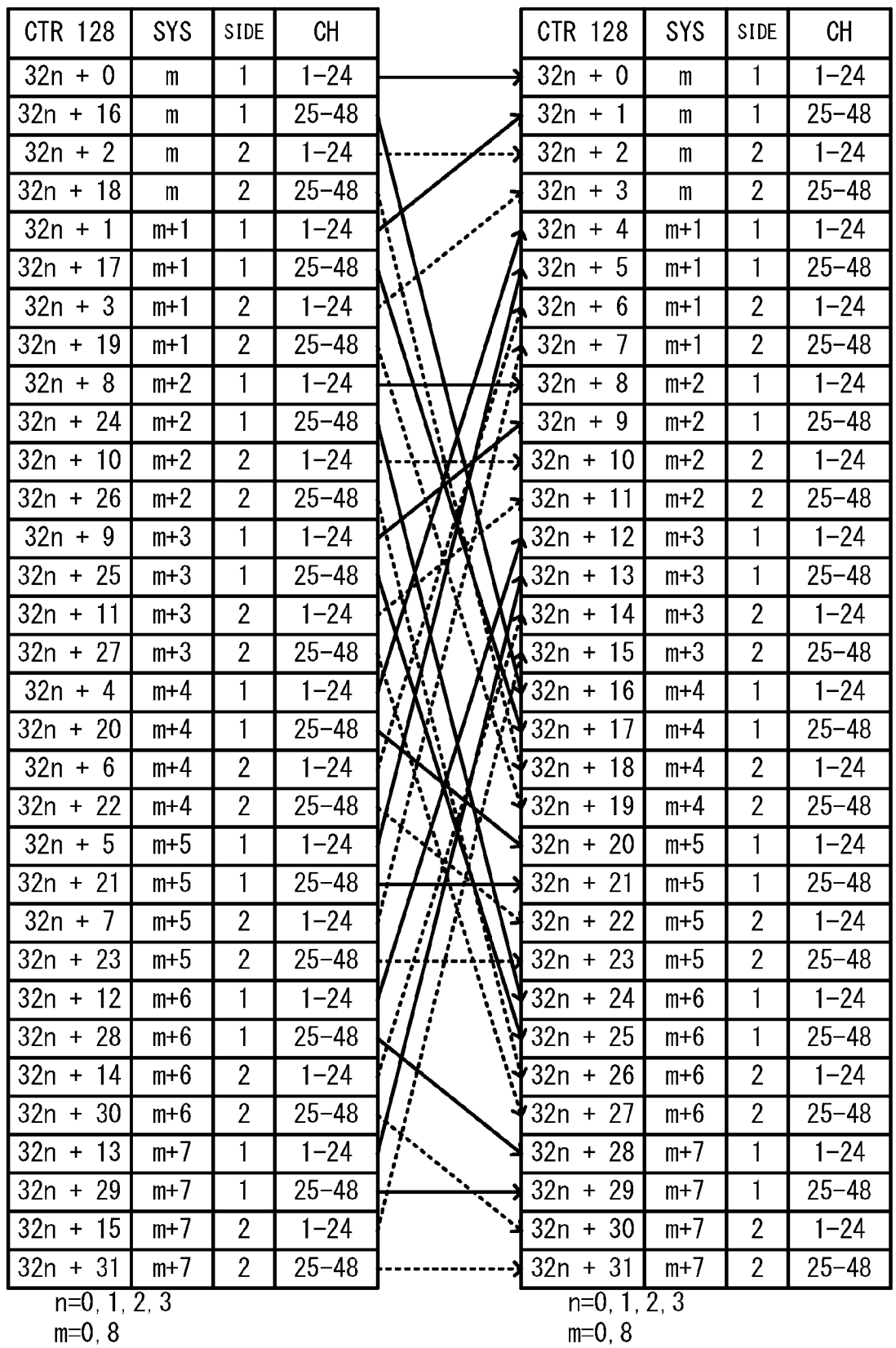
FIG. 14 is a diagram illustrating a BLSR change.

In the case (2F-BLSR of OC-768) where the BLSR information is "10", the setting unit is considered as channels corresponding to 16 sys (=1536 channels), and as illustrated in FIG. 14, a read address of 128-adic counter (CTR 128) illustrated at right side is generated with respect to the write address of 128-adic counter (CTR 128) illustrated at left side. That is, [4:0] of five bits of the low-order of the read address of the memory are interchanged to [0], [3], [4], [1], [2] in the write address, thereby converting into alignment of the output of the BLSR change (BLSR CHG). Note that, in FIG. 14, channels corresponding to 8 sys are illustrated, and the channels corresponding to the remaining 8 sys are also the same.

Figure 15:
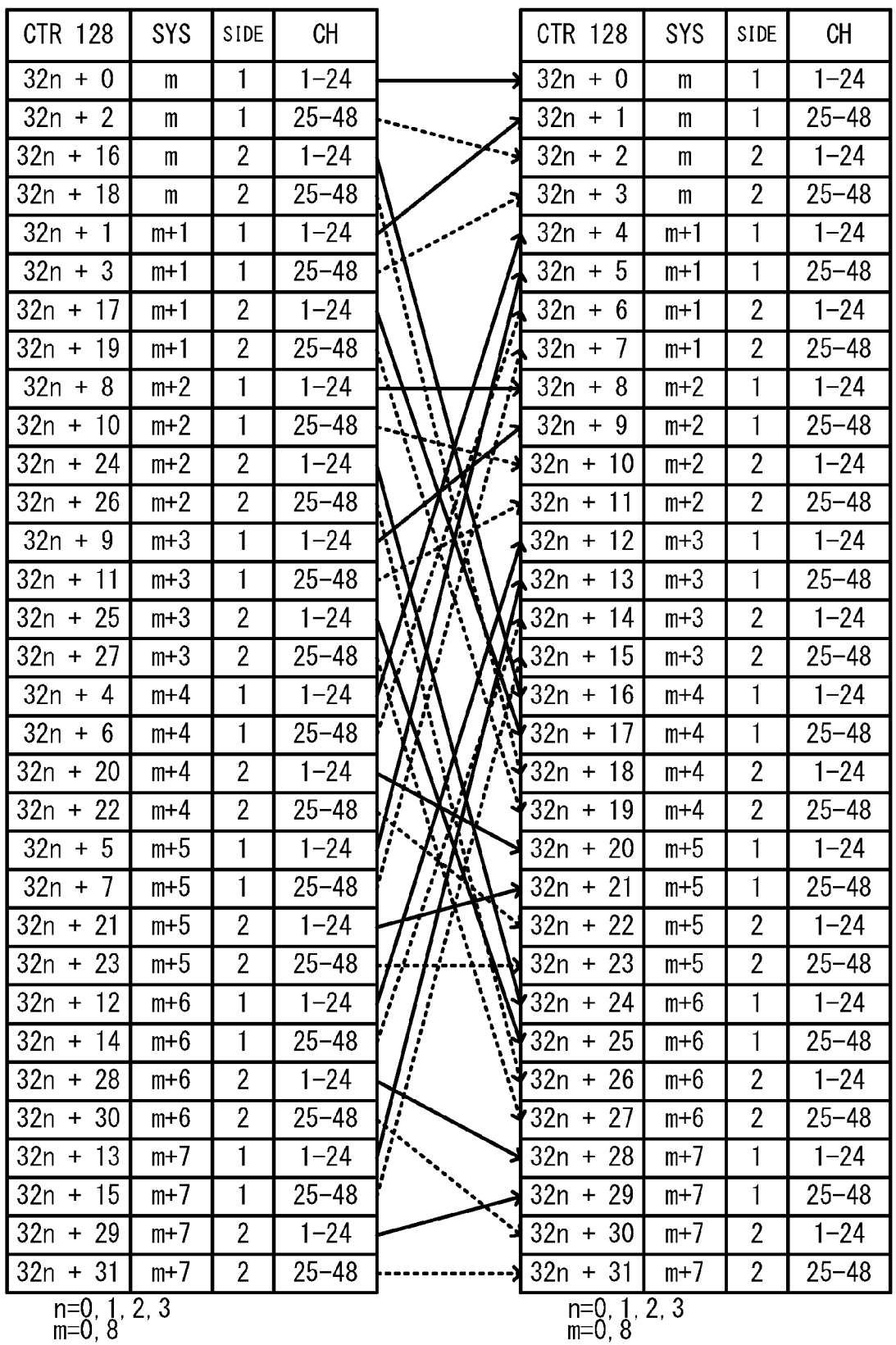
FIG. 15 is a diagram illustrating a BLSR change.

In the case (4F-BLSR of OC-192 or OC-768) where the BLSR information is "11", the setting unit shall be channels corresponding to 8 sys for OC-192, and channels corresponding to 32 sys for OC-768, and as illustrated in FIG. 15, a read address of 128-adic counter (CTR 128) illustrated at right side is generated with respect to the write address of 128-adic counter (CTR 128) illustrated at left side. That is, [4:0] of five bits of the low-order of the read address of the memory are interchanged to [1], [3], [4], [0], [2] in the write address, thereby converting into the alignment of the output of the BLSR change (BLSR CHG). Note that, in FIG. 15, channels corresponding to 8 sys are illustrated and the channels corresponding to the remaining 24 sys for OC-768 are also the same.

Slot Change Part (SLOT CHG)

Figure 16:
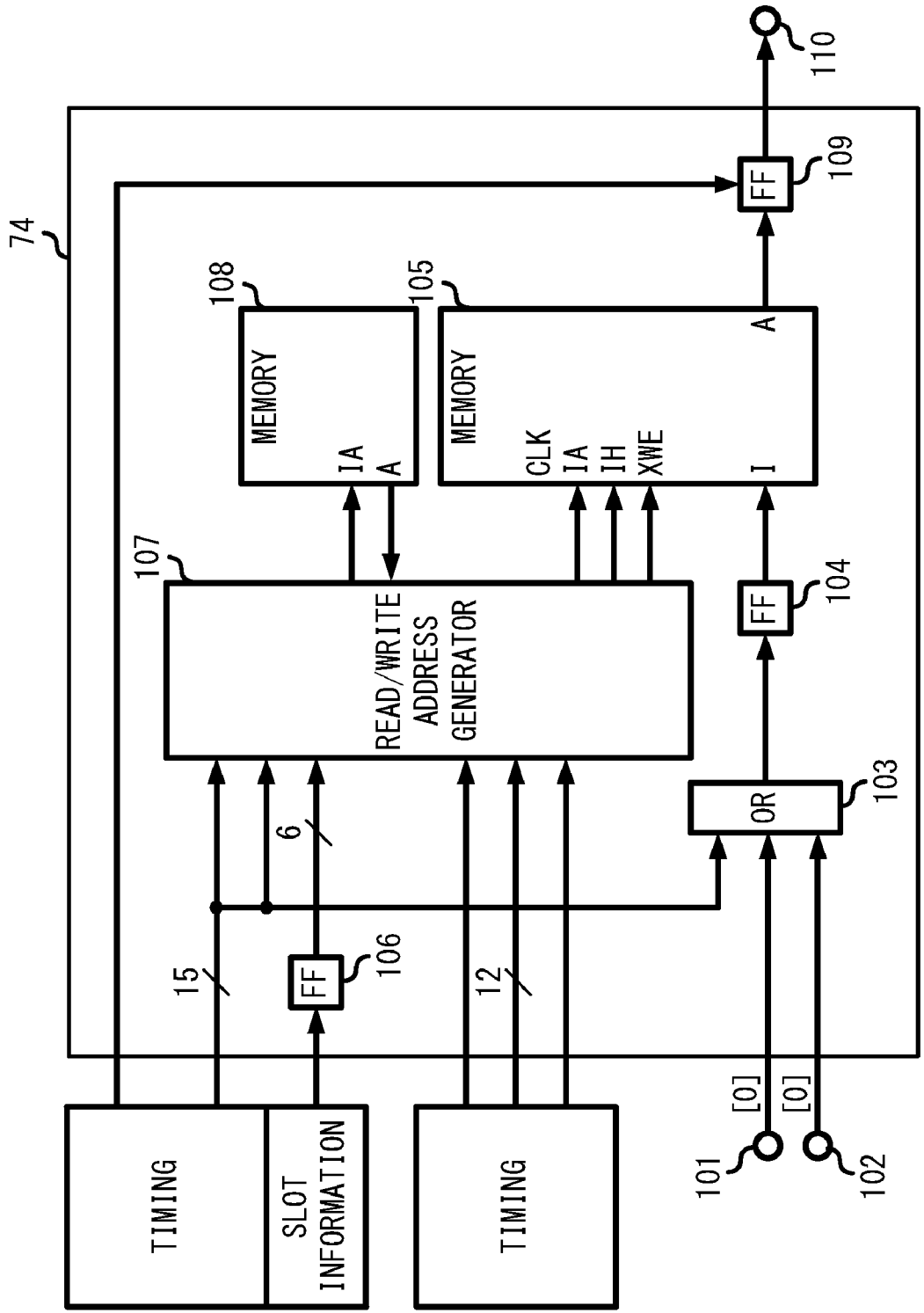
FIG. 16 is a diagram illustrating a block diagram of an embodiment of the slot change part.

FIG. 16 is a diagram illustrating a block diagram of an embodiment of the slot change part 74. In the diagram, RIP information of one bit at East side, West side is respectively input to terminals 101, 102. One of the RIP information is selected by a selector 103, and is supplied to a one port memory (MEMORY) 105 via a flip flop (FF) 104. Further, slot information of 6 bits is supplied to a read/write address generator 107 via a flip flop (FF) 106.

Herein, the slot information is physical configuration information of the node apparatus. Numbers are attached to the slot information to divide the interface cards 21-1 (IF#1) to 21-24 (IF#24) illustrated in FIG. 6 into, for example, a first half portion (first portion) and a second half portion (second portion). The slot information indicates a portion (first portion or second portion) of the interface card from which a time slot being input and being subjected to a cross connect processing at the present time is output.

A memory 108 has a slot change table in which slot information for indicating the first portion or the second portion of the interface card to which a time slot subjected to a cross connect processing is output by means of the slot information as an address is preliminarily stored. The slot change table is preliminarily determined for every node apparatus depending on the configuration of the node apparatus.

The read/write address generator 107 reads the memory 108 by means of the supplied information as an address, obtains slot information for indicating the first portion or the second portion of the interface card to which the time slot is output, generates a write address in which the slot information indicating the first portion or the second portion of the interface card is a high order address and count value (number of time slot) which is the counted timing signal is a low order address, and supplies to the memory 105. Herewith, RIP information corresponding to the time slot is written at the position corresponding to the first portion or the second portion of the interface card to which the time slot is output.

Further, the read/write address generator 107 counts a timing signal and generates a sequential read address and supplies to the memory 105. And time slot change is executed by reading the RIP information corresponding to the time slot in the order of the time slot of the SONET signal to be output. The RIP information read from the memory 105 is output from a terminal 110 via a flip flop (FF) 109, and is supplied to the transport overhead insertion part (TOH INS) 47.

ACM Code Interchange

Incidentally, an ACM code which is cross connect information used in the cross connect part (TSI) 43 illustrated in FIG. 7 is generated to be the same sys-number rule as the RIP information, and the ACM code is subjected to a BLSR change and a slot change so as to be the slot rule, and is supplied to the TSI 43, and a cross connect of the time slot of the actual main signal is executed.

Figure 17:
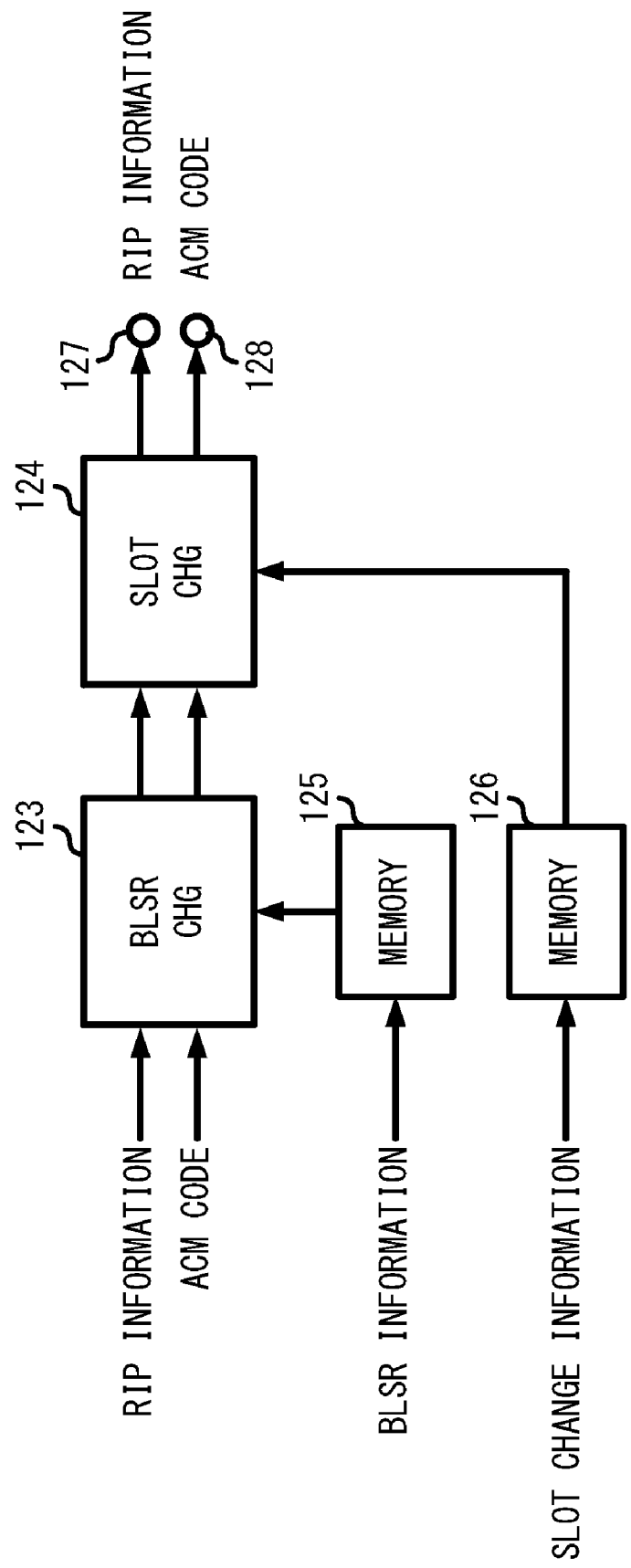
FIG. 17 is a diagram illustrating a block diagram of an embodiment in which the RIP information conversion part and an ACM code conversion part are partly commoditized.

FIG. 17 is a diagram illustrating a block diagram of an embodiment in which the RIP information conversion part and an ACM code conversion part are partly commoditized. In the diagram, the RIP information (output of OR 71, 72) and the ACM code (after processed by service selector) are supplied to a BLSR change part (BLSR CHG) 123.

BLSR information is supplied to the BLSR CHG 123 from a memory 125, and the BLSR CHG 123 executes a BLSR change of the RIP information and the ACM code at the same time by simultaneously writing and reading the RIP information and the ACM code in and from an embedded memory corresponding to the memories 82, 83 in the RLSR CHG 73 illustrated in FIG. 10.

Slot information is supplied to a slot change part (SLOT CHG) 124 from a memory 126, and the SLOT CHG 124 executes a slot change of the RIP information and the ACM code at the same time by simultaneously writing and reading the RIP information and the ACM code in and from an embedded memory corresponding to the memory 105 in the SLOT CHG 74 illustrated in FIG. 16.

The RIP information output from the SLOT CHG 124 is supplied to the TOH INS 47 from a terminal 127. Further, the ACM code output from the SLOT CHG 124 is supplied to the TSI 43 from a terminal 128.

In the aforementioned embodiment, distributed processing becomes possible by providing the RIP conversion controller 33 that executes a RIP conversion processing in the interface card, thereby flexibly coping with increase of processing of the node apparatus.

Further, in the interface card, by separating the RIP information from the transport overhead after switching the work signal and protection signal by the SEL 37, increase of circuit dimension and power consumption is restrained, and it becomes easy to expand capacity for the future.

Further, by selecting alarm detection setting data (provisioning information) at a normal time and a relief SS time when the relief SS is provided for providing one system by the RIP conversion controller 33, the interface card is provided by using a generic ASSP (Application Specific Standard Product) chip.

Further, by equipping the BLSR CHG 73 and the SLOT CHG 74 in the switch fabrics 23, 24, RIP information is rearranged to meet the slot rule in the interface card, so that a path alarm detection function is equipped in the interface card, and it becomes possible for the interface card to execute a processing without depending on an application.

Further, by executing the processing of the BLSR change and the slot change at the same time by using the BLSR CHG 123 and the SLOT CHG 124 by letting run cross connect information (ACM code) and converting information of RIP information in parallel, the circuit for executing the BLSR change and the slot change are commoditized and increase of circuit dimension/power consumption are restrained.

Further, by transmitting RIP information to the interface card from the switch fabric by multiplexing in the section overhead of a SONET signal, increase of signal lines of the back plane board for connecting the switch fabric and the interface card are restrained.

Consequently, the above-mentioned node apparatus makes it possible to distribute processing by providing a RIP conversion processing in an interface unit, thereby flexibly coping with increase of processing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions has been described in detail, it should be understood that the various changes, substitutions, and alterations could be made hereto without departing from the spirit and scope of the invention.

What is claimed is:

1. A node apparatus having a plurality of interface units interfacing to a transmission line, switch units of a work system and a protection system to switch signals of the transmission line, the node apparatus comprising: a first controller configured to control relieving a failure over at least one ring network to which a network configuration is applied, in the switch units; a second controller configured to include a first storage medium to store first setting information having a threshold value for a path alarm detection applied on a normal operation and a second storage medium to store second setting information having the threshold value for the path alarm detection applied on relieving the failure over the ring networks, and to control selecting one of the first and second setting information in the interface units; and an alarm detector configured to detect a path alarm based on the selected setting information, and wherein the node apparatus interconnects with the at least one ring network, to which a network configuration with one of a Drop and Continue on Protection channel and a Dual Transmission Protection channel is applied to relieve the failure over the at least one ring network.

2. The node apparatus according to claim 1, wherein the second controller controls a signal selected from signals transferred from the switch units of the work system and the protection system.

3. The node apparatus according to claim 2, wherein the switch unit includes:
- generation means configured to generate activation information used to relieve the failure over the at least one ring network based on the first and second setting information used to relieve the failure and span information stored in a table configured to store information of a span passed by each channel;
- allocation means configured to allocate the activation information into a time slot of a signal outputted from the switch unit; and
- multiplex means configured to multiplex the activation information allocated into the time slot on an overhead area.

4. The node apparatus according to claim 3, wherein the allocation means include a first allocation means configured to allocate the activation information based on the network configuration, and a second allocation means configured to allocate the activation information allocated by the first allocation means based on information of a physical configuration of the node apparatus.

5. The node apparatus according to claim 4, wherein the multiplex means multiplexes the activation information on a section overhead area.

6. The node apparatus according to claim 5, wherein the second controller controls to de-multiplex the activation information from the section overhead area of signals transferred from the switch units of the work system and the protection system.

7. The node apparatus according to claim 6, wherein the allocation means is shared with an allocation means of cross-connecting information of a main signal in the node apparatus.

8. The node apparatus according to claim 7, wherein the second controller controls a distribution of processing of ring interconnecting protection information in at least one of the interface units.

9. The node apparatus according to claim 1, wherein at least one of the interface units includes an interface card having a path alarm detection function.

10. The node apparatus according to claim 3, wherein the multiplexing means transmits the activation information to at least one of the interface units.

* * * * *